Patented Mar. 26, 1935

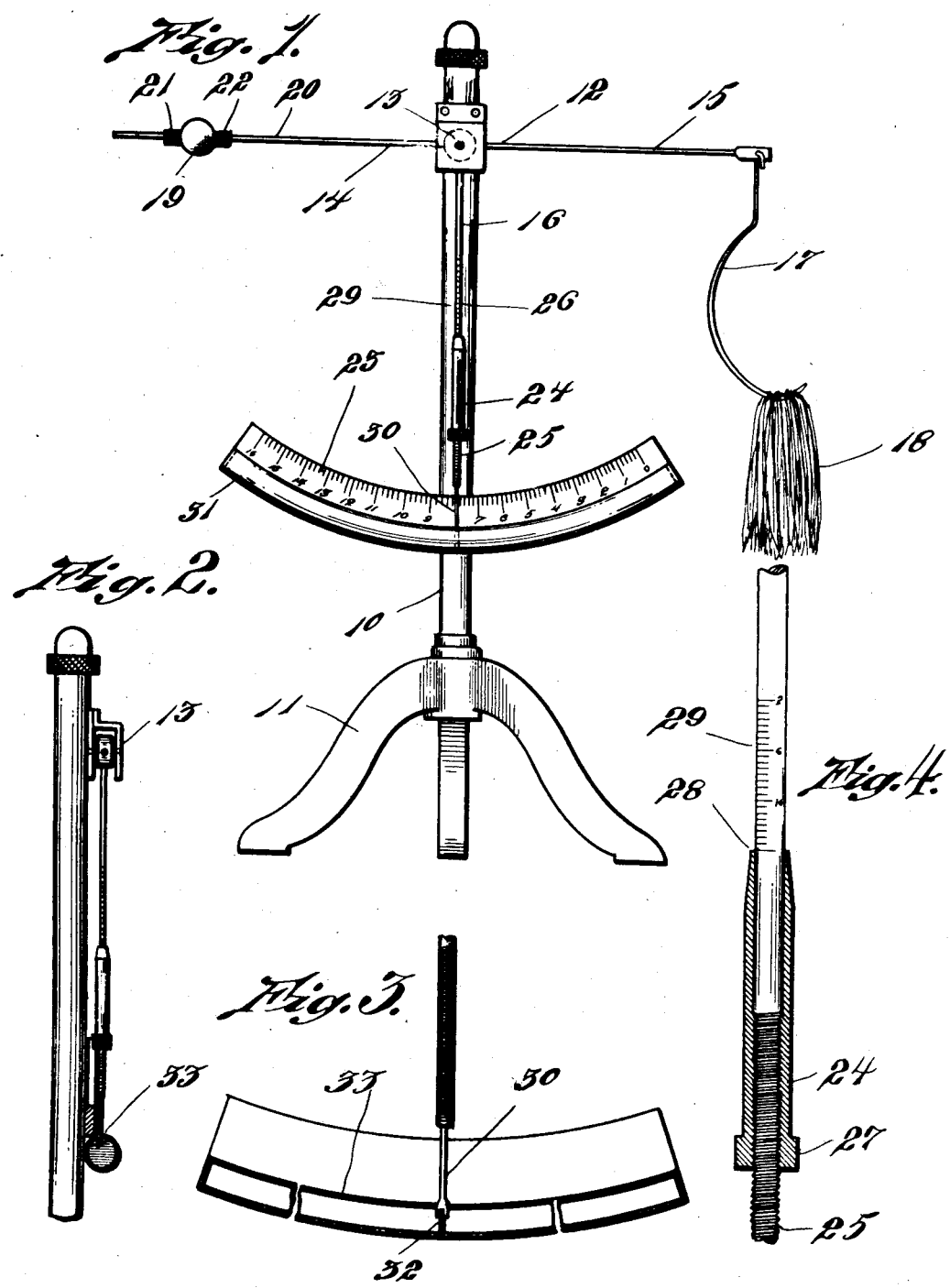

1,995,550

UNITED STATES PATENT OFFICE 1,995,550

MOISTURE COMPENSATING WEIGHING DEVICE

David C. Scott, Providence, R. I., assignor to Henry L. Scott Company, a corporation of Rhode Island Application January 20, 1931, Serial No. 509,941

1 Claim. (Cl. 265—36)

This invention relates to a device for determining the size or weight of yarn or any hydroscopic material; and has for its object to provide an apparatus which by weighing a certain length of yarn will indicate the size or weight thereof in standard units.

A further object of the invention is the provision of means in such a device to compensate for the moisture content of the yarn so that the same may be mechanically reduced to standard measurements and the reading obtained be in the desired weight.

A still further object of the invention is the provision of means for preventing excessive oscillation of the weighing device that the same may come to rest so that quick reading may be obtained.

With these and other objects and advantageous features in view, the invention consists of a novel arrangement of parts more fully disclosed in the detailed description following, in conjunction with the accompanying drawing, and more particularly set forth in the appended claim.

In the drawing:

Fig. 1 is a front elevation showing the device with work supported thereon;

Fig. 2 is a fragmental detail of the standard showing the indicating arm and the dampening tube through which a portion attached to the arm moves;

Fig. 3 is a central longitudinal section on a slightly enlarged scale of the indicating scale and indicator of this invention;

Fig. 4 is an enlarged view of the indicating arm showing in section the adjustable weight which is movable therealong.

Cotton yarn absorbs moisture in a certain percentage to its weight dependent upon the humidity of the atmosphere surrounding it. The moisture content of cotton yarns varies its weight and must be calculated in determining different strengths, sizes and the like to reduce the figures to an adopted standard.

A standard of sizes has been arranged with reference to cotton yarns indicating the weight of the yarn; Size No. 1 indicated that 120 yards of #1 yarn will weight 1,000 grains Troy weight provided the yarn contains 7% moisture which is the allowable amount, 7% moisture having been adopted as a standard to which other measures must be reduced. By my construction, I have provided a means and method by which the size, number or weight of the yarn may be determined as if it contained 7% moisture mechanically computed by adjustment of the parts thereof, which consists of a generally T-shaped arm with the leg of the T moving over a pointer and upon which leg there are graduations for the setting of a weight movable along the leg to vary the device for different moisture conditions of the atmosphere in which the test is being made, and which the work will contain when weighed; and the following is a detailed description of the present embodiment of this invention illustrating the preferred means by which these advantageous results may be accomplished.

With reference to the drawing, 10 designates a standard suitably supported by legs 11 with a T-shaped member 12 pivoted as at 13 thereon and having arms 14 and 15 forming the head of the T extending on either side of the pivot 13. A leg or arm portion 16 extends at right angles to the head portion, and from the juncture of its arms 14 and 15 at which point the member is pivoted. Any suitable means such as a hook 17 is secured to the arm 15 upon which the work or yarn 18 may be supported. Upon the arm 14 a counterweight 19 is mounted which may be adjusted along the threaded portion 20 thereof by means of nuts 21 and 22 at either side of the weight to compensate for the weight of the arms, friction and the like.

A scale 23 is secured to the standard 10 and over this scale the leg portion 16 will swing. A weight 24 is adjustable along the leg portion 16 by means of the threads 25 on the leg and graduations 26 are provided along the leg 16 so that the weight 24 may be adjusted to a suitable point consistent with the amount of moisture contained in the work being weighed. A suitable flange 27 with a knurled edge may be manually engaged for ready adjustment of the weight along the leg, and this weight is reduced as at 28 at its upper end for more accurate positioning along the leg to obtain the desired compensation.

The usual standard length of yarn from which determinations are made, as above set forth, is 120 yards. In practice, 120 yards of yarn will be supported from the means 17 as indicated at 18 in the drawing. From a re-gain balance it may be determined the amount of moisture contained in the yarn at the time the test is to be made. Should this be 5% the weight 24 would be adjustable so that its edge 28 is positioned at the graduation 5, illustrated by 29 on the drawing, and then should the pointer 30 which moves over the scale 23 be at 8, as indicated in the sketch in Figure 1, it would be determined that the yarn was size No. 8. Should, however, the pointer move to No. 2, it would be determined that the yarn was of No. 2 size, or that 120 yards thereof when it contained 7% moisture would weight 500 grains Troy, and similarly along the entire scale. This movement of the weight eliminates the usual computation of calculating the yarn weight as if bone dry and then adding 7% moisture.

It is found that in the use of delicate apparatus of this character a teetering or swinging of the T-shaped member may occur, and in order to dampen this movement, I have provided a tube 31 mounted along the lower edge of the scale and a diaphragm plate or disk 32 mounted upon the end 30 of the pointer will swing therein by reason of the pointer swinging in the slot 33 provided in the tube, which will steady the motion of the swinging member and cause it to come to rest quickly that the size or weight of the work may be quickly determined.

It will be observed that the adjustments of the weight 24 along the arm 16 will affect the weighing in positions in which the arm is at an angle to the vertical and when the arm is so adjusted, the weight of the device will assume a position similar to that shown in Figure 1, so that the weight being in a vertical position will exert no force upon the apparatus.

I have described the device in connection with its use for cotton yarn, but it will be readily observed that it may be used for any hydroscopic material by a variation of the scales to reduce the same to an adopted standard.

While I have described certain construction forms which embody the principles of my invention, it is obvious that other desired changes in arrangement may be made within the spirit and the scope of the invention as defined in the appended claim.

I claim:

A testing device comprising a standard, an arm pivoted on said standard, means for supporting work to be tested from said arm, an adjustable counterweight secured to said arm, a scale having markings thereon, an indicating arm movable over said scale, said arms being connected to move together, and means on said indicating arm for compensating for the moisture content in the yarn and graduation on said arm for setting said compensating means, and means for dampening the action of said indicating arm.

DAVID C. SCOTT.